F. A. Tenney,
Oscillating Meter,

Nº 21,283.   Patented Aug 24, 1858.

UNITED STATES PATENT OFFICE.

F. A. TENNEY, OF CONCORD, NEW HAMPSHIRE.

WATER-METER.

Specification of Letters Patent No. 21,283, dated August 24, 1858.

*To all whom it may concern:*

Be it known that I, FRANKLIN A. TENNEY, of Concord, in the county of Merrimack and State of New Hampshire, have invented a new and Improved Water-Meter; and I do hereby declare that the following is a full and exact description thereof, reference being had to the accompanying drawings, making a part of this specification.

Figure 1:
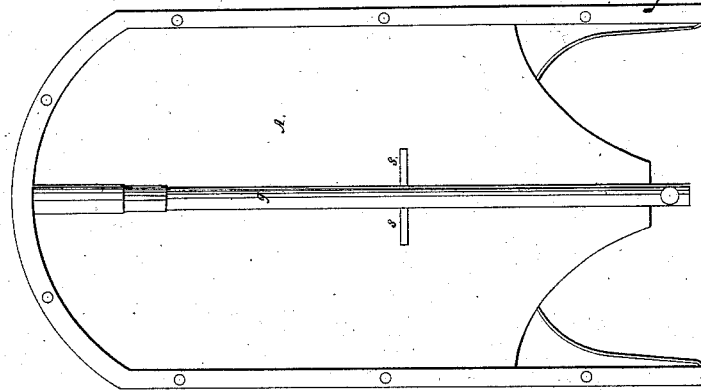
Figure 2:
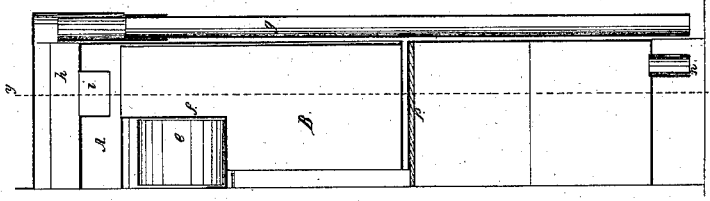
Figure 3:
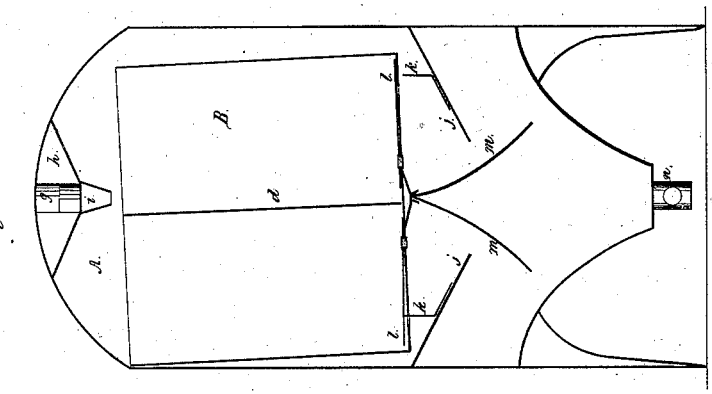
Figure 4:
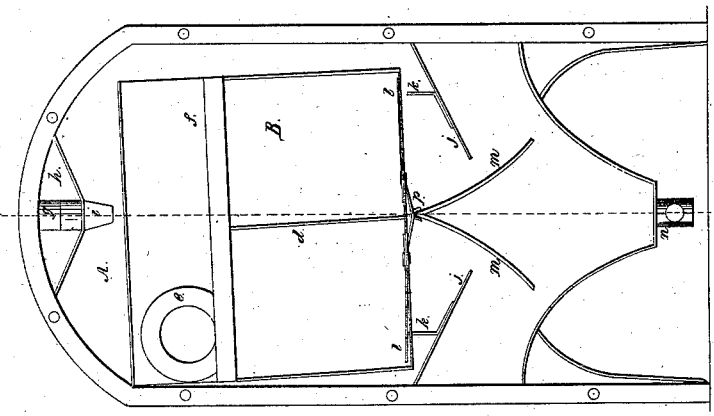

Figure 1, is a front elevation of my improved water-meter, after the front portion of the case thereof has been removed; Fig. 2, a section in the line $x$, $x$, of Fig. 1; Fig. 3, a section in the line $y$, $y$, of Fig. 2; and Fig. 4 a view of the rear side of said meter.

Similar letters indicate the same parts in each drawing.

The form of the exterior casing A, of my improved water-meter, is clearly represented by the accompanying drawings.

The water is measured as it passes through the meter by means of the double-chambered oscillating vessel B, in the manner hereinafter set forth.

The wings $m$, $m$, which project inwardly from the back of the casing A, terminate in a sharp edge that receives the bearing channel $p$, formed on the under side of the bottom of the measuring vessel B, immediately below the lower end of the partition $d$, which divides the said vessel into two equal compartments.

Valve-apertures in the bottom of each compartment of the measuring vessel B, are closed by the spring valves $l$, $l$. The inclined wings $j$, $j$, which project inwardly from the sides of the casing A, have pins $k$, $k$, rising vertically therefrom which are located in such positions that, when the vessel B, is oscillated from side to side, the said pins will pass through the valve-apertures in the bottom thereof and alternately open the valves $l$, $l$, for the water to flow out of one of the compartments of said vessel while a stream of water is flowing into the other compartment of the same and vice versa.

The water to be measured, is first admitted into the apartment $h$, at the extreme upper end of the casing A, from the pipe $g$; and from said apartment the water flows through the central nozzle $i$, into the measuring vessel B. A roller-box $f$, is combined with the front portion of the measuring vessel B, and the roller $e$, which plays freely back and forth in said box, is of such a weight that it will hold the said vessel in its tilted position until the measured water has entirely flowed out of one of the compartments of the measuring vessel and also until the proper quantity of water has flowed into the opposite compartment of the same, when the weight of the said measured quantity of water will tilt the said vessel over to its opposite position, and by so doing, will open the eduction valve in the bottom of the said filled compartment, and at the same time the upper end of the partition $d$, of the measuring vessel, will be thrown into such a position that the water will flow from the nozzle $i$, into the empty compartment of said vessel: and so on in succession the measuring compartments of the oscillating vessel B, will be alternately filled and emptied, and the number of the oscillations thereof may be accurately registered by any suitable registering machinery.

The water, as it flows from the measuring vessel, will first fall on to one of the wings $j$, and then on to one of the wings $m$, during its passage to the eduction tube $n$, at the bottom of the casing A. The said wings $m$, $j$, prevent the eduction valves $l$, $l$, of the measuring vessel from being tampered with by means of any instrument inserted into the eduction pipe $n$.

The water must not be admitted into the chamber $h$, of the casing A, with any greater rapidity than it is permitted to flow out from the compartments of the measuring vessel, and from the eduction pipe $n$, of the casing A. This can be regulated by means of stop-cocks whose capacity is proportioned to the head of the water from which the meter is supplied, and to the eduction apertures of the compartments of the measuring vessel. The eduction pipe $n$, should always be a little larger than either of the valve apertures of the measuring vessel, for the purpose of preventing the obstruction of the free movements of said vessel by flooding the lower portion of the casing A, with water.

By freely opening the supply pipe of the meter and then but partially opening the eduction pipe of the same, the water might be drawn in a minute stream from the meter without being measured or its contents indicated by the registering apparatus. To prevent this, I form a concealed aperture $s$, in the back of the meter, which is so located that it will allow the water to flow off from the lower portion of the chamber within the casing A, before it rises high enough to impede the free movements of the measuring vessel B; and consequently, all the water that can be passed through my said improved meter, must necessarily be measured and registered.

As there is no appreciable friction produced by the movements of the measuring vessel B, my improved meter must perform its work with the most perfect accuracy.

The respective portions of my improved water-meter may be constructed of such materials as may be deemed expedient, and the said parts, while they must be properly proportioned to each other, may be combined with each other in any suitable mechanical manner.

The rolling weight $e$, for regulating the tilting movements of the measuring vessel B, may not be the most perfect mechanical contrivance for accomplishing that object. I may therefore substitute for the said rolling weight a tilting weight, or some other form of shifting weight which will produce the desired effect.

Having thus fully described my improved water-meter, what I claim therein as new and desire to secure by Letters Patent, is—

The arrangement of the shifting weight $e$, the spring valves $l$, $l$, and the pins $k$, $k$, or the equivalents of said parts, with the double-chambered vessel B, substantially in the manner and for the purpose herein set forth.

The above specification of my improved water meter signed and witnessed this 18th day of May 1858.

F. A. TENNEY.

Witnesses:
   Z. C. ROBBINS,
   EDW. F. BROWN.